United States Patent Office 2,721,174
Patented Oct. 18, 1955

2,721,174

EMULSIFIED ACIDS FOR HIGH TEMPERATURE WELLS

Harold W. Brainerd, Jr., Tulsa, Okla., assignor to Stanolind Oil and Gas Company, Tulsa, Okla., a corporation of Delaware No Drawing. Application September 6, 1952,
Serial No. 308,287

10 Claims. (Cl. 252—8.55)

This invention relates to the art of acidizing oil, gas and water wells and more particularly to the use of an emulsion of acid in oil for fracturing subterranean formations, for protecting the metal parts of tubing through which the acid is injected, for delayed action acidizing or for any combination of these effects.

Emulsions previously proposed for these purposes are satisfactory in general except that many of them have a tendency to break down into separate phases at the high formation temperatures before the emulsion reaches the bottom of the well.

An object of this invention is to provide an improved acid-in-oil composition suitable for treating wells. A more particular object is to provide an acid-in-oil emulsion capable of fracturing calcareous formations penetrated by wells having relatively high temperatures; the emulsion being capable of suspending sand to prop open the fractures. Another object is to provide an acid-in-oil emulsion suitable for protecting the metal tubing through which the acid is injected into relatively high temperature wells. An additional object is to provide an acid-in-oil emulsion suitable for delayed action acidizing of high-temperature wells.

In general, I accomplish the objects of my invention by forming a temporary emulsion, employing as an emulsifying agent certain oil-soluble ethers or thioethers to be more exactly defined hereinafter. The composition, then, is made up of oil, an aqueous acid solution and the emulsifying agent. The theory of why my emulsion becomes unstable after a short time is not well understood. A possible explanation of the action however, is that the high temperature of some wells is sufficient to upset the emulsion stability if given sufficient time and cause separation of the phases without chemically affecting the emulsifying agent. It is possible, also, that the ether linkages in the emulsifier employed are hydrolyzed to a certain extent when the emulsifier is widely dispersed at the interfacial surface between the oil and acid phases. This explanation is considered to be somewhat unlikely. Another possible explanation is that the water-soluble acid, being an electrolyte, may affect the emulsion to a sufficient extent to break the emulsion. This possibility is also unlikely since one of the principal characteristics of emulsions employing non-ionic emulsifiers such as ethers, is their stability in the presence of electrolytes. As explained later, the emulsion is also broken when the hydrochloric acid reacts with limestone. Thus, apparently, the reaction of the water-soluble acid, present in the water phase to an extent of as much as 20 per cent, is sufficient to unstabilize the emulsion and cause separation of phases. The most probable explanation for the action of my emulsion is that the class of emulsifying agents employed simply forms emulsions sufficiently unstable to be broken by changes such as increased temperature or reaction of one of the emulsion constituents. Another indication of the relatively unstable nature of the emulsions is the critical limitations on the quantity of emulsifier, the acid-to-oil ratio, the acid concentration in the aqueous phase and the mixing procedure required.

Considering the aqueous phase of the emulsion in more detail, the preferred material is the aqueous 15 per cent HCl solution normally employed in acidizing. However, a concentration as high as 20 per cent HCl based on the aqueous phase, is satisfactory. When HCl concentrations substantially above 20 per cent are employed, the emulsion becomes unstable. The aqueous phase may contain as little as 5 per cent HCl and still form a stable emulsion. Such a composition may be desirable in acid wash operations, for example. Other halogen acids may be employed in about the same concentration range. Hydrogen fluoride is particularly advantageous for treating sandy limestone and even sand formations themselves. Other mineral acids such as nitric or sulfuric may be used with due precaution being taken against the formation of insoluble reaction products of the acids with formation brines or with the formations themselves. Light oragnic acids such as acetic acid or modified organic acids such as the chloroacetic acids may also be employed with advantage in many cases.

When the term "water-soluble acids" is used hereinafter, an acid is intended having water solubility high enough to produce the desired acid concentration. Thus, for example, in acid washing operations in which an acid concentration of only about 5 or 10 per cent is desired, a water solubility of about 5 to 10 per cent is sufficient and an acid with such a solubility is to be classed as "water-soluble" for purposes of this invention.

In order to determine the effective concentration range of acids which can be employed, acid-in-oil emulsions were prepared using about 5 per cent by volume of kerosene and about 95 per cent of aqueous hydrochloric acid solutions of various acid contents. The emulsifying agent was 1 per cent by weight of Antarox A–401. This material is an ether of nonyl phenol and tetraoxyethylene. The stabilities of the emulsions at various temperatures were determined by placing samples of the emulsions in 4-ounce glass bottles and suspending them in water baths at various temperatures. The samples were then examined periodically to determine the time required for the emulsion phases to separate at the various temperatures. The results are presented in Table I below and are expressed in terms of hours required for the emulsion to break.

Table I

| Acid Concentration, Percent by Weight of Aqueous Phase | Temperatures, ° F. | | | | |
|---|---|---|---|---|---|
| | 80 | 100 | 120 | 160 | 180 |
| 30 | (¹) | (¹) | (¹) | (¹) | (¹) |
| 20 | 100 | 22 | 22 | 18 | 4 |
| 15 | (²) | 38 | 18 | 2 | ½ |
| 10 | 160 | 100 | 18 | 1 | ½ |
| 5 | (²) | 30 | 4 | 1 | ½ |

¹ No emulsion formed.
² Stable after two weeks except for minor phase separation.

As previously mentioned, the presence of limestone for some reason has a considerable effect on the stability of emulsions prepared according to this invention. In one test, for example, an emulsion was prepared employing 5 parts by volume of kerosene, 95 parts by volume of an aqueous 15 per cent hydrochloric acid solution and 1 per cent by weight of Antarox A–401. A piece of limestone, 1" x ½" x ½" was dropped into 100 ml. of this emulsion. The emulsion separated into two phases in about 5 minutes although the temperature was only 80° F. Apparently, the removal of the 15 per cent hydrochloric acid from the aqueous phase was sufficient to render the emulsion unstable and cause separation of the oil and water phases. While the explanation is uncertain, the effect is quite definite. This emulsion can be injected into a limestone-containing formation without the slightest fear that the emulsion will remain stable and plug the formation. It may be thought that 5 minutes is a rather short time for delayed-action acidizing or for extending fractures. However, it must be remembered that this entire time is available for these functions since during the time required to pump the emulsion to the bottom of the wall, it shows no tendency to break down even at high temperatures. The emulsion is obviously highly applicable in cases where it is merely desired to protect the metal tubing in a well until the acid reaches the formation to be acidized; the continuous oil phase protecting the tubing from the acid. The figures in Table I demonstrate that, until the acid contacts the formation, the emulsion is quite stable even at temperatures as high as 160° F. The data also show that the concentration of acids should not exceed about 20 per cent by weight of the aqueous phase if a stable emulsion is desired.

The oil phase of the emulsion is preferably a refined petroleum fraction such as kerosene, stove oil, diesel fuel or the like. The use of such a refined petroleum fraction avoids possible difficulties with natural emulsifiers present in crude oil. However, the type of oil is, in general, not critical and most oils, even petroleum crude oils, usually can be successfully employed as the oil phase. When the term "oil" is employed, a liquid hydrocarbon oil, such as those named above or one of the benzene or toluene series is intended.

The emulsifier must be oil-soluble and relatively water-insoluble in order to insure the formation of a water-in-oil type emulsion so that the metal tubing and the formation are protected from the acid by a film of oil. The emulsifier must be non-ionic so that it will not be materially affected by the strong acid electrolyte present in the emulsion. The emulsifier must be free from ester linkages since at high temperatures these are too rapidly hydrolyzed, particularly in the presence of the strong mineral acids. The above qualifications limit the field of emulsifiers to those containing ether and thioether linkages. In general, my emulsifiers can be classified as ethers of two materials, one being a water-soluble portion which is either a polyoxyalkylene chain containing at least 2 but not more than 4 oxyalkylene groups or a polyglycerol containing no more than 3 ether linkages. The other portion is the oil-soluble part and is an alcohol or mercaptan containing at least 12 carbon atoms per molecule. The polyoxyalkylene is preferably polyoxyethylene although polyoxypropylene is also a suitable material so long as at least 1 and not more than 3 ether linkages are present in the chain. The lower limitation is required to assure water solubility of this portion of the molecule. The upper limitation is necessary to insure that the material does not become too water soluble so that the emulsifying agent dissolves in the aqueous phase rather than being concentrated at the oil-water interface. The organic residue attached to the hydroxyl or mercaptyl portion of the emulsifier may be aromatic, aliphatic or alicyclic so long as such residue contains at least 12 carbon atoms to insure sufficient oil solubility of the emulsifier.

Particularly suitable types of alcohols or mercaptans are the alkylated phenols and thiophenols such as nonylphenol and nonylthiophenol. The preferred emulsifier for my invention is the tetraoxyethylene ether of nonylphenol. This material is available from the Antara Chemicals Division of the General Dyestuff Corporation and is distributed to the trade under the name "Antarox A-401."

The emulsifying agents suitable for my purposes can be conveniently represented by the formula RXW. In this formula, W represents the water-soluble portion of the molecule and is selected from the group consisting of polyoxyethylene chains, often referred to as polyglycols, and polyglycerols containing from 1 to 3 ether linkages. Thus, this portion may be, for example, any of the following groups:

—$CH_2CH_2(OCH_2CH_2)_nOH$
—$CH_2CH_2CH_2(OCH_2CH_2CH_2)_nOH$
—$CH_2CHOHCH_2(OCH_2CHOHCH_2)_nOH$ in which $n$ is an integer from 1 to 3 inclusive. It will be noted that these groups are not really complete polyglycols and polyglycerols, but are what might better be called polyglycol and polyglycerol radicals in which one hydroxyl group is missing to give an open bond by which these water-soluble radicals can be connected to an oil-soluble portion of the emulsifying agent.

In the formula RXW, X represents either oxygen or sulfur which serves as an ether-type linkage between the water-soluble and oil-soluble portions of the emulsifying agent.

R represents the oil-soluble portion which is an inert organic radical containing at least 12 and preferably less than about 30 carbon atoms per radical to insure oil-solubility of the portion. This radical may contain inert groups such as halogens, ether linkages, or hydroxyl groups, but since these affect the solubility of the inert oil-soluble portion, it is very much preferred that this portion be an alkyl, cycloalkyl or aralkyl hydrocarbon radical. Alkyl groups may, for example, be straight chains containing 18, 16 or 12 carbon atoms introduced by using oleyl, cetyl or lauryl alcohols or mercaptans respectively to form the ether or thioether. Suitable cycloalkyl groups are derivatives of cyclopentyl or cyclohexyl radicals, the derivatives carrying a side chain of at least about 7 and preferably about 9 carbon atoms. The preferred inert organic portion is an alkylated phenyl or naphthyl groups such as nonyl phenyl or octyl naphthyl. Although in these preferred radicals, the ether or thioether is usually formed with a hydroxyl or mercaptyl group on the aromatic ring, ether-forming groups may also be on the alkyl side chain.

In order to determine the effective range of emulsifier concentrations, the stability of emulsions of 95 parts by volume of aqueous hydrochloric acid solutions in 5 parts kerosene was determined, employing a 15 per cent by weight acid concentration in the aqueous phase, and with various concentrations of Antarox A-401 as the emulsifier. Results are presented in Table II in which stability times are expressed in hours required for the phases to separate at the various temperatures indicated.

*Table II*

| Emulsifier Concentration, Percent by Weight of Emulsion | Temperature, ° F. | | | | |
|---|---|---|---|---|---|
| | 80 | 100 | 120 | 160 | 180 |
| 0.1 | (1) | (1) | (1) | (1) | (1) |
| 0.5 | 200 | 38 | 18 | 2 | ½ |
| 1.0 | (2) | 38 | 18 | 2 | ½ |
| 2.0 | 240 | 40 | 18 | 18 | 1 |
| 5.0 | (2) | (2) | (2) | 24 | 2 |
| 10.0 | (2) | (2) | (2) | 30 | 2 |

1 No emulsion formed.
2 Stable after two weeks except for minor separation of phases.

The data in Table II illustrate that a minimum limitation of about 0.5 per cent emulsifier by weight should be observed in order to insure the formation of a stable emulsion. About 10 per cent by weight should not be exceeded since the emulsion attains an unnecessarily high stability for my purposes at higher concentrations. About 0.5 to 2.0 per cent by weight has been found to be the preferred range of concentration for the emulsifier.

In order to determine the effective range of the ratio of oil to acid, acid-in-oil emulsions were prepared using 1 per cent by weight of Antarox A-401 as an emulsifier for a mixture of aqueous HCl solution and kerosene in various ratios. The aqueous acid solution contained 15 per cent by weight HCl. The results are presented in Table III in which the values presented represent the hours required for the phases of the emulsion to separate at the various temperatures and at various acid-to-oil ratios.

*Table III*

| Acid, Parts by Volume | Oil, Parts by Volume | Temperature, ° F. | | | | |
|---|---|---|---|---|---|---|
| | | 80 | 100 | 120 | 160 | 180 |
| 99 | 1 | (¹) | 24 | 28 | 4 | ½ |
| 98 | 2 | 120 | 36 | 20 | 4 | 1 |
| 95 | 5 | (¹) | 24 | 28 | 6 | 1½ |
| 90 | 10 | (¹) | 24 | 28 | 6 | ½ |
| 80 | 20 | (²) | (²) | (²) | (²) | (²) |
| 60 | 40 | (²) | (²) | (²) | (²) | (²) |

¹ Stable after 2 weeks except for minor separation of phases.
² Thin and unstable emulsion.

The data in Table III demonstrate that the quantity of oil should not be as much as 20 per cent by volume of the emulsion if a stable viscous emulsion is to be formed. Therefore, a maximum limitation of about 15 percent or preferably about 10 per cent by volume should be observed with respect to the oil content of the emulsion. On the other hand, less than 1 per cent oil should not be employed since such an emulsion is difficult to prepare and the oil film around the separate acid droplets becomes too thin to afford adequate protection to the metal parts or to the formation treated.

If it is desired to fracture a formation by hydraulic pressure by use of processes such as those described in 2,596,843 Farris or 2,596,137 Fast, for example, it is customary to employ a viscous material. Viscosity is generally measured by use of a cup-type instrument such as the Stormer viscosimeter. However, when an attempt is made to measure the viscosity of my emulsion by this means, it is found that the oil film lubricates the motion of the emulsion in the cup so that the emulsion turns as a plug in the cup. A meaningless reading is thus obtained from this type of instrument. Since the important value is the rate of flow of the emulsion through a formation, it was decided to determine the effective viscosity of the emulsion when squeezed through a body of sand, as a close laboratory approach to what actually happens in the field. In this test, an emulsion was prepared containing 1 per cent by weight of Antarox A-401, 95 parts by volume of an aqueous solution containing 15 per cent by weight of HCl, and 5 parts by volume of kerosene. The resulting mixture was stirred slowly at 140° F. for 20 minutes to simulate pumping to the bottom of a 6,000 foot well. The emulsion was then squeezed through a 6-inch section of a 1-inch pipe packed with Ottawa sand. The flow rate of the emulsion through the nipple at 150 p. s. i. differential across the section was measured and the effective viscosity was calculated from the previously calibrated permeability of the sand-packed nipple. The viscosity was 220 centipoises which is quite adequate for fracturing most limestone formations.

To check the sand-suspending ability of emulsified acids, the same emulsion as just described in connection with the viscosity test was employed. One pound of sand was added to 1 gallon of this emulsion at 80° F. After 2 weeks of standing, the sand appeared to be well dispersed in the emulsion, very little settling having taken place. The sand employed in this test was a fine sand of fairly uniform grain size of which 90 per cent would pass through a 20-mesh screen and be retained on a 40-mesh screen.

In mixing the proposed emulsified acid, the following procedure should be employed. A primary emulsion should first be formed by mixing approximately equal volumes of the aqueous acid solution and of the oil containing the emulsifying agent. After the primary emulsion has been prepared, the additional aqueous acid solution should then be slowly blended into the primary emulsion until the final emulsion containing the desired ratio of oil to aqueous acid solution is obtained. An effort to mix the entire water and oil volumes without following the proposed procedure frequently fails to form a stable acid emulsion.

From the above description and data, it will be apparent that I have accomplished the objects of my invention by providing an improved acid-in-oil emulsion capable of fracturing calcareous formations and suspending sand to prop open the fractures even at relatively high temperatures. The emulsion is sufficiently stable to protect the metal tubing and provide a delayed action on formations treated even at the relatively high bottom hole temperatures existing in some wells. The emulsion, on the other hand, is only temporarily stable at elevated temperatures and particularly in the presence of limestone, thereby insuring a reduction of viscosity with time to a value which is certain to avoid plugging producing formations.

I claim:

1. An acid-to-oil emulsion for use in wells comprising from about 85 to 99 parts by volume of an aqueous phase containing from about 5 to 20 per cent by weight of a water-soluble acid, from about 1 to 15 parts by volume of an oil, and from 0.5 to 10 per cent by weight, based on the emulsion, of an emulsifying agent with the formula RXW wherein W is a water-soluble portion selected from the group consisting of polyglycol and polyglycerol radicals containing from 1 to 3 ether linkages, X is an ether-type linkage selected from the group consisting of oxygen and sulfur, and R is an oil-soluble, inert, ester-free, organic portion containing at least 12 carbon atoms.

2. An acid-in-oil emulsion for use in wells comprising from about 85 to 99 parts by volume of an aqueous phase containing from about 5 to 20 per cent by weight of a water-soluble acid, from about 1 to 15 parts by volume of an oil, and from 0.5 to 10 per cent by weight, based on the emulsion, of an emulsifying agent with the formula RXW wherein W is a water-soluble portion selected from the group consisting of polyglycol and polyglycerol radicals containing from 1 to 3 ether linkages, X is an ether-type linkage selected from the group consisting of oxygen and sulfur, and R is an oil-soluble portion selected from the group consisting of alkyl, cycloalkyl and aralkyl hydrocarbon radicals containing at least 12 carbon atoms per radical.

3. The composition of claim 2 in which said water-soluble acid is hydrochloric acid.

4. The composition of claim 2 in which said emulsifying agent has the formula RXW wherein W is a polyoxyethylene chain containing between 2 and 4 oxyethylene group, X is selected from the group consisting of oxygen and sulfur, and R is an aralkyl hydrocarbon radical containing at least 12 carbon atoms per radical.

5. The composition of claim 2 in which said emulsifying agent is the tetraoxyethylene ether of nonylphenol.

6. The composition of claim 2 in which said water-soluble acid is hydrochloric acid and said emulsifying agent is the tetraoxyethylene ether of nonylphenol.

7. A process for treating a well comprising introducing into said well an acid-in-oil emulsion comprising from about 85 to 99 parts by volume of an aqueous phase containing from about 5 to 20 per cent by weight of a water-soluble acid, from about 1 to 15 parts by volume of an oil, and from 0.5 to 10 per cent by weight based on the emulsion, of an emulsifying agent with the formula RXW wherein W is a water-soluble portion selected from the group consisting of polyglycol and polyglycerol radicals containing from 1 to 3 ether linkages, X is an ether-type linkage selected from the group consisting of oxygen and sulfur, and R is an oil-soluble, inert, ester-free, organic portion containing at least 12 carbon atoms, and forcing said emulsion into a formation penerated by said well.

8. The process of claim 7 in which the emulsifying agent has the formula RXW wherein W is selected from the group consisting of polyglycol and polyglycerol radicals containing from 1 to 3 ether linkages, X is selected from the group consisting of oxygen and sulfur and R is selected from the group consisting of alkyl, cycloalkyl and aralkyl hydrocarbon radicals containing at least 12 carbon atoms per radical.

9. The process of claim 7 in which said emulsifying agent is the tetraoxyethylene ether of nonylphenol.

10. The process of claim 7 in which said water-soluble acid is hydrochloric acid and said emulsifying agent is the tetraoxyethylene ether of nonylphenol.

References Cited in the file of this patent

UNITED STATES PATENTS

| | | |
|---|---|---|
| 1,922,154 | De Groote | Aug. 15, 1933 |
| 2,050,933 | De Groote | Aug. 11, 1936 |
| 2,356,254 | Lehman et al. | Aug. 28, 1944 |
| 2,596,137 | Fast | May 13, 1952 |